US010920986B2

(12) United States Patent
Tsunoda et al.

(10) Patent No.: US 10,920,986 B2
(45) Date of Patent: Feb. 16, 2021

(54) GAS TURBINE COMBUSTOR BASE PLATE CONFIGURATION

(71) Applicant: MITSUBISHI HITACHI POWER SYSTEMS, LTD., Kanagawa (JP)

(72) Inventors: Naoki Tsunoda, Tokyo (JP); Satoshi Takiguchi, Tokyo (JP); Shinji Akamatsu, Yokohama (JP); Taku Egawa, Yokohama (JP); Kenta Taniguchi, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 648 days.

(21) Appl. No.: 15/511,814

(22) PCT Filed: Oct. 5, 2015

(86) PCT No.: PCT/JP2015/078253
§ 371 (c)(1),
(2) Date: Mar. 16, 2017

(87) PCT Pub. No.: WO2016/056521
PCT Pub. Date: Apr. 14, 2016

(65) Prior Publication Data
US 2017/0307219 A1 Oct. 26, 2017

(30) Foreign Application Priority Data

Oct. 6, 2014 (JP) .................................. 2014-205824
Oct. 6, 2014 (JP) .................................. 2014-205825

(51) Int. Cl.
*F23R 3/28* (2006.01)
*F23R 3/10* (2006.01)
*F02C 3/04* (2006.01)

(52) U.S. Cl.
CPC ............. *F23R 3/286* (2013.01); *F02C 3/04* (2013.01); *F23R 3/10* (2013.01); *F05D 2220/32* (2013.01); *F05D 2240/35* (2013.01)

(58) Field of Classification Search
CPC .. F23R 3/10; F23R 3/286; F23R 3/283; F23R 3/343; F02C 3/04; F05D 2240/35
See application file for complete search history.

(56) References Cited

U.S. PATENT DOCUMENTS 6,772,594 B2 * 8/2004 Nishida .................. F23R 3/002
60/737
7,316,117 B2 * 1/2008 Ohri ........................ F23R 3/14
60/748

(Continued)

FOREIGN PATENT DOCUMENTS

| JP | 2003-014232 | 1/2003 |
| JP | 2005-114318 | 4/2005 |

(Continued)

OTHER PUBLICATIONS

International Search Report dated Dec. 28, 2015 in International Application No. PCT/JP2015/078253 (with English translation).
Written Opinion of the International Searching Authority dated Dec. 28, 2015 in International Application No. PCT/JP2015/078253 (with English translation).

*Primary Examiner* — Jason H Duger
(74) *Attorney, Agent, or Firm* — Wenderoth, Lind & Ponack, L.L.P.

(57) ABSTRACT

A combustor (3) includes a plurality of first burners extending along an axis (P) and arranged at intervals in the circumferential direction, a base plate (31) having support openings configured to support the plurality of first burners and a plurality of through-holes (34) through which base plate air flows toward a downstream side, a plurality of extension pipes supported by the base plate (31) to correspond to the first burners and configured to guide a premixed gas ejected from the first burners toward the down- (Continued)

stream side, and a base plate air guide section (35) configured to change a direction of at least some of the base plate air ejected from the through-holes (34) at a downstream side of the base plate (31).

9 Claims, 9 Drawing Sheets

(56) References Cited

U.S. PATENT DOCUMENTS

| | | | | |
|---|---|---|---|---|
| 8,113,000 B2* | 2/2012 | Laster | ............... | F23R 3/286 |
| | | | | 60/39.11 |
| 8,387,393 B2* | 3/2013 | Landry | ............... | F02C 7/22 |
| | | | | 60/737 |
| 8,408,002 B2* | 4/2013 | Moriwaki | ............ | F23R 3/12 |
| | | | | 60/747 |
| 2003/0014975 A1 | 1/2003 | Nishida et al. | | |
| 2013/0269352 A1 | 10/2013 | Angel et al. | | |

FOREIGN PATENT DOCUMENTS

| | | | |
|---|---|---|---|
| JP | 2005114193 A | * | 4/2005 |
| JP | 4070758 | | 4/2008 |
| JP | 2012-154588 | | 8/2012 |
| JP | 2013190196 A | * | 9/2013 |

* cited by examiner

GAS TURBINE COMBUSTOR BASE PLATE CONFIGURATION

TECHNICAL FIELD

The present invention relates to a combustor and a gas turbine including the same.

Priority is claimed on Japanese Patent Application Nos. 2014-205824 and 2014-205825, filed Oct. 6, 2014, the contents of which are incorporated herein by reference.

BACKGROUND ART

In a combustor used in a gas turbine or the like, a pre-mixing combustion method of previously mixing fuel with compressed air (combustion air) sent from a compressor to generate an air-fuel mixture and combusting the air-fuel mixture is widely used.

As such a combustor, there is known a combustor having a second burner installed on an axis of the combustor and a plurality of first burners disposed in parallel to the second burner. Then, the second burner and the first burners are fixed to a main body of the combustor as the burners are supported by a base plate in which support openings corresponding to diameters thereof are formed. Further, elliptical tubular extension pipes disposed to cover a main nozzle from the outside in a radial direction are installed at the base plate. That is, a surface of the base plate is divided into a plurality of partitions by the extension pipes.

The first burner having the above-mentioned structure mixes fuel and air therein to generate a pre-mixed gas, and forms flames extending from tips of the extension pipes toward a downstream side by combusting the pre-mixed gas.

Here, in the gas turbine combustor that employs the pre-mixing combustion method, a known phenomenon that is referred to as backfire occurs as flames propagate backward in a flow direction of the air-fuel mixture in a region where the flow velocity of the air-fuel mixture is low (a low speed region).

In particular, in the region formed between the plurality of extension pipes adjacent to each other on the base plate, in addition to the fact that the air on the base plate flows toward only a downstream side, for example, since a frictional resistance against a combustor basket or the like occurs toward a position spaced apart from the axis of the combustor, loss in air flow velocity on the base plate is increased. Accordingly, the probability that the pre-mixed gas is caught from the inside toward the outside of the extension pipes to propagate backward in a direction of the base plate is increased. That is, backfire may occur in a low speed region formed between the extension pipes.

In this way, as a technology of reducing the probability of backfire occurring in the vicinity of the extension pipes, for example, a technology disclosed in Patent Document 1 is known. In the gas turbine combustor disclosed in Patent Document 1, as a cross-sectional shape in outlets of the extension pipes becomes similar to a rectangular shape from an elliptical shape, an area of regions formed between the neighboring extension pipes is reduced. That is, as the low speed region formed in the region is reduced, the probability of the backfire is reduced.

CITATION LIST

Patent Literature

[Patent Document 1]
  Japanese Patent No. 4070758

SUMMARY OF INVENTION

Technical Problem

However, in the technology disclosed in Patent Document 1, since only the low speed region remains by reducing the size of the low speed region, the low speed region itself is still present. Accordingly, a flow element of the pre-mixed gas flowing backward toward the region formed between the extension pipes is still present to some extent.

That is, there is a room for additional improvement in technology disclosed in Patent Document 1 when achieving a reduction in the probability of backfire occurring in the combustor.

Solution to Problem

In order to solve the above-mentioned problems, a combustor and a gas turbine of the present invention propose the following means.

According to a first aspect of the present invention, a combustor includes a plurality of first burners extending along an axis and arranged at intervals in a circumferential direction; a base plate having support openings configured to support the plurality of first burners and a plurality of through-holes through which base plate air flows toward a downstream side; a plurality of extension pipes supported by the base plate to correspond to the first burners and configured to guide a pre-mixed gas ejected from the first burners toward the downstream side; and a base plate air guide section configured to change a direction of at least some of the base plate air ejected from the through-holes at a downstream side of the base plate.

According to the above-mentioned configuration, as the base plate air guide section is installed at the downstream side of the base plate, the base plate air ejected from the through-holes can be guided to flow to a desired region at the downstream side of the base plate. Accordingly, the flow distribution of the base plate air can be optimized.

Further, according to a second aspect of the present invention, in the combustor according to the first aspect, the base plate air guide section may be formed by a base plate air extension section configured to guide and eject the base plate air ejected from the through-holes toward a further downstream side of the base plate.

According to the above-mentioned configuration, as the base plate air extension section is installed, the base plate air ejected from the through-holes can be guided toward a further downstream side of the base plate. Accordingly, the probability of a backward flow toward the base plate of the upstream side of flames generated by the pre-mixed gas ejected from the extension pipes can be decreased.

Further, according to a third aspect of the present invention, in the combustor according to the second aspect, the base plate air extension section may be formed by a pipe body installed to correspond to at least some of the plurality of through-holes, formed in the base plate, and extending toward the downstream side.

According to the above-mentioned configuration, the pipe body installed to correspond to the through-hole is used as the base plate air extension section. Further, the pipe body extends from the base plate toward the downstream side. Accordingly, the base plate air ejected from the through-holes can be more reliably guided and ejected toward the downstream side of the base plate.

Further, according to a fourth aspect of the present invention, in the combustor according to the third aspect, a plurality of pipe bodies may be installed, and inner diameters of the plurality of pipe bodies may be set to be decreased as the pipe bodies are disposed at positions separated from the axis.

In general, it is known that the probability of backfire is also increased because a speed loss of the pre-mixed gas is increased as the pre-mixing gas is disposed at the position separated from the axis on the base plate. According to the above-mentioned configuration, the inner diameter is formed to be decreased as the pipe bodies are disposed at the positions separated from the axis. Accordingly, the flow velocity of the base plate air flowing through the pipe body can be increased as it is separated from the axis.

Further, according to a fifth aspect of the present invention, in the combustor according to the third or fourth aspect, dimensions in the axial direction of the plurality of pipe bodies may be set to be increased as the pipe bodies are disposed at positions separated from the axis.

According to the above-mentioned configuration, the dimensions in the axial direction are set to be increased as the pipe bodies are disposed at the positions separated from the axis. Accordingly, the base plate air can be guided toward a further downstream side as the pipe bodies are disposed at the positions separated from the axis on the base plate. Accordingly, the probability of backfire can be further reduced.

Further, according to a sixth aspect of the present invention, the combustor may further include thick sections configured to fill gaps between the plurality of pipe bodies.

According to the above-mentioned configuration, the gaps formed between the plurality of pipe bodies are filled with the thick sections. Accordingly, a pre-mixed gas does not flow backward toward the gaps between the pipe bodies. Accordingly, the probability of backfire can be further reduced.

Further, according to a seventh aspect of the present invention, in the combustor according to the first aspect, the base plate air guide section may be formed by a base plate air direction change section configured to change a direction of at least some of the base plate air ejected from the through-holes at the downstream side of the base plate.

According to the above-mentioned configuration, as the base plate air direction change section is installed at the downstream side of the base plate, the base plate air ejected from the through-holes can be changed in a direction to flow toward a desired region at the downstream side of the base plate. Accordingly, the flow distribution of the base plate air can be optimized.

Further, according to an eighth aspect of the present invention, in the combustor according to the seventh aspect, the base plate air direction change section may be formed by a partition plate extending from the base plate toward the downstream side.

According to the above-mentioned configuration, the partition plate extending from the base plate toward the downstream side is installed as the base plate air direction change section. Further, the partition plate is formed to divide a face of the downstream side of the base plate into a plurality of partitions. Accordingly, the base plate air ejected from the through-holes can be changed to a desired direction as the base plate air is divided into a plurality of flows by the partition plate.

Further, according to a ninth aspect of the present invention, in the combustor according to the eighth aspect, the plurality of partition plates may be formed to be gradually curved from the base plate toward the downstream side in a direction away from the axis.

In general, it is known that since a speed loss of the pre-mixed gas is also increased as the pre-mixed gas is disposed at the position separated from the axis on the base plate, the probability of backfire can be increased. According to the above-mentioned configuration, the speed loss of the pre-mixed gas can be compensated for by changing the direction in which the base plate air flows to the direction away from the axis using the partition plate.

Further, according to a tenth aspect of the present invention, in the combustor according to the eighth or ninth aspect, the partition plates may form a plurality of partitions including the through-holes, the number of which is increased as the partitions are disposed at the positions separated from the axis, by dividing the base plate in the radial direction.

According to the above-mentioned configuration, a larger number of through-holes are formed as the partitions are disposed at the positions separated from the axis. Accordingly, the probability of backfire can be reduced by ejecting a large amount of base plate air toward the downstream side as the partitions are disposed at the positions separated from the axis on the base plate.

Further, according to an eleventh aspect of the present invention, in the combustor according to any one of the eighth to tenth aspects, the partition plates form the plurality of partitions including the through-holes, opening diameters of which are decreased as the partitions are disposed at the positions separated from the axis, by dividing the base plate in the radial direction.

According to the above-mentioned configuration, the through-holes are formed such that the opening diameters are decreased as the through-holes are disposed at the positions separated from the axis. Accordingly, the probability of backfire can be decreased by increasing the flow velocity of the base plate air ejected from the through-holes disposed at the positions separated from the axis.

Further, according to a twelfth aspect of the present invention, in the combustor according to any one of the first to eleventh aspects, the combustor may further include a second burner disposed along the axis to be surrounded by the plurality of first burners from the outside in the radial direction of the axis.

According to the above-mentioned configuration, as the second burner is provided, ignition with respect to the first burners can be more easily performed.

Further, a gas turbine according to a thirteenth aspect of the present invention includes the combustor according to any one aspect of the first to twelfth aspects; a compressor configured to supply compressed air into the combustor; and a turbine configured to receive a combustion gas generated by combusting the pre-mixed gas in the combustor.

According to the above-mentioned configuration, since the combustor in which the probability of backfire is decreased is provided, the gas turbine capable of a more stable operation can be provided.

Advantageous Effects of Invention

According to the combustor and the gas turbine of the present invention, probability of backfire can be further reduced.

DESCRIPTION OF EMBODIMENTS

First Embodiment

Hereinafter, a first embodiment of the present invention will be described with reference to the accompanying drawings.

Figure 1:
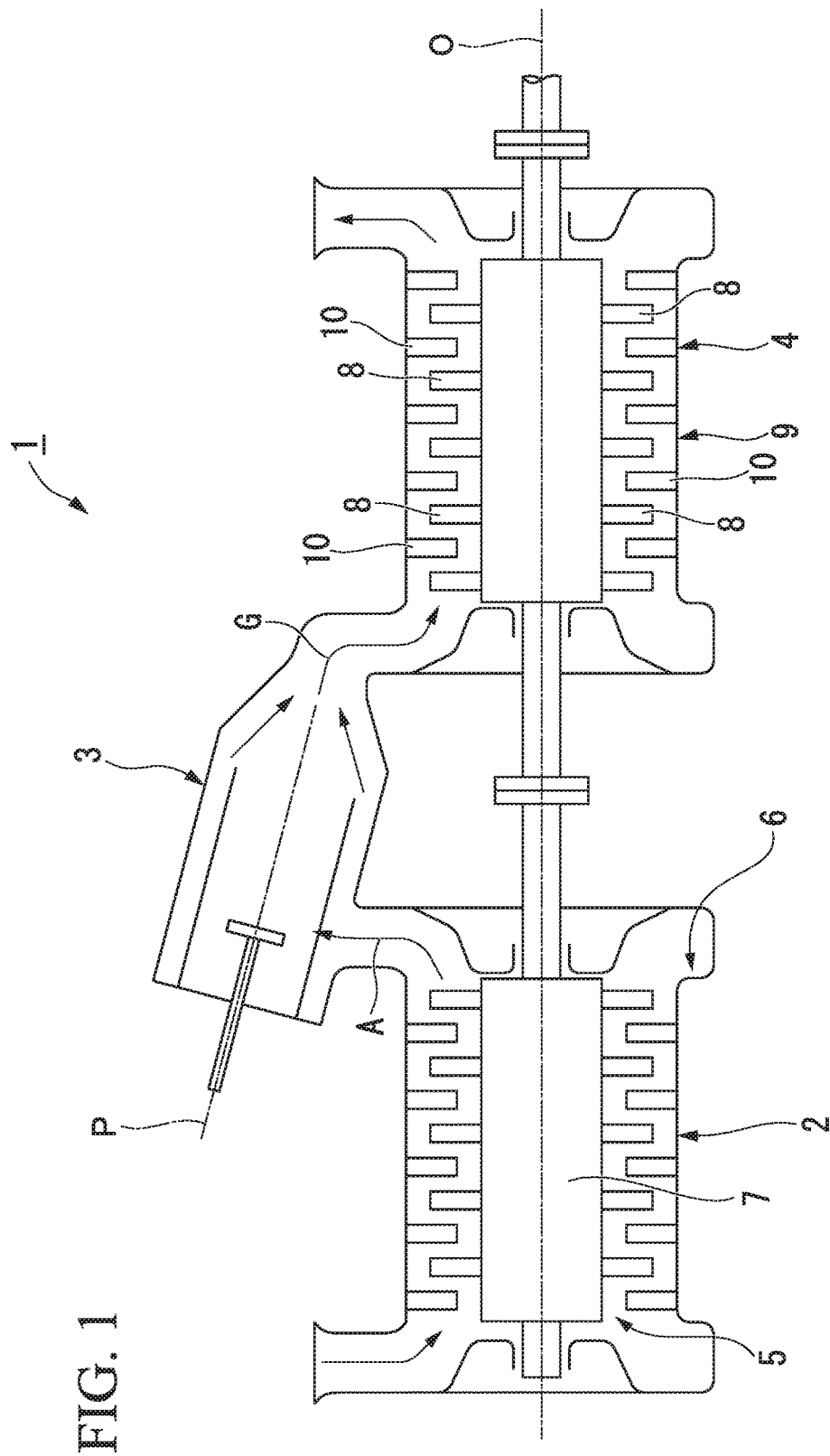
FIG. 1 is a schematic view of a gas turbine according to a first embodiment of the present invention.

As shown in FIG. 1, a gas turbine 1 according to the embodiment includes a compressor 2 configured to take a large amount of air thereinto and compress the air, a combustor 3 configured to mix fuel with compressed air A compressed by the compressor 2 and combust the mixed fuel and air, and a turbine 4 configured to convert thermal energy of a combustion gas G introduced from the combustor 3 into rotational energy.

Each of the compressor 2 and the turbine 4 includes a rotor 5 and a stator 6 configured to surround an outer circumferential side of the rotor 5. The rotors 5 of the compressor 2 and the turbine 3 are connected to be integrally rotated with each other. The rotor 5 has a rotary shaft 7, and a plurality of annular turbine blade groups 8 fixed in an axis O direction at intervals. Each of the annular turbine blade groups 8 is configured to have a plurality of turbine blades fixed to an outer circumference of the rotary shaft 7 at intervals in a circumferential direction.

The stator 6 includes a casing 9, and a plurality of annular turbine vane groups 10 fixed in the casing 9 at intervals in the axis O direction. Each of the annular turbine vane groups 10 has a plurality of turbine vanes fixed to an inner surface of the casing 9 at intervals in the circumferential direction.

The annular turbine vane groups 10 are disposed alternately with respect to the plurality of annular turbine blade groups 8 in the axis O direction.

Figure 2:
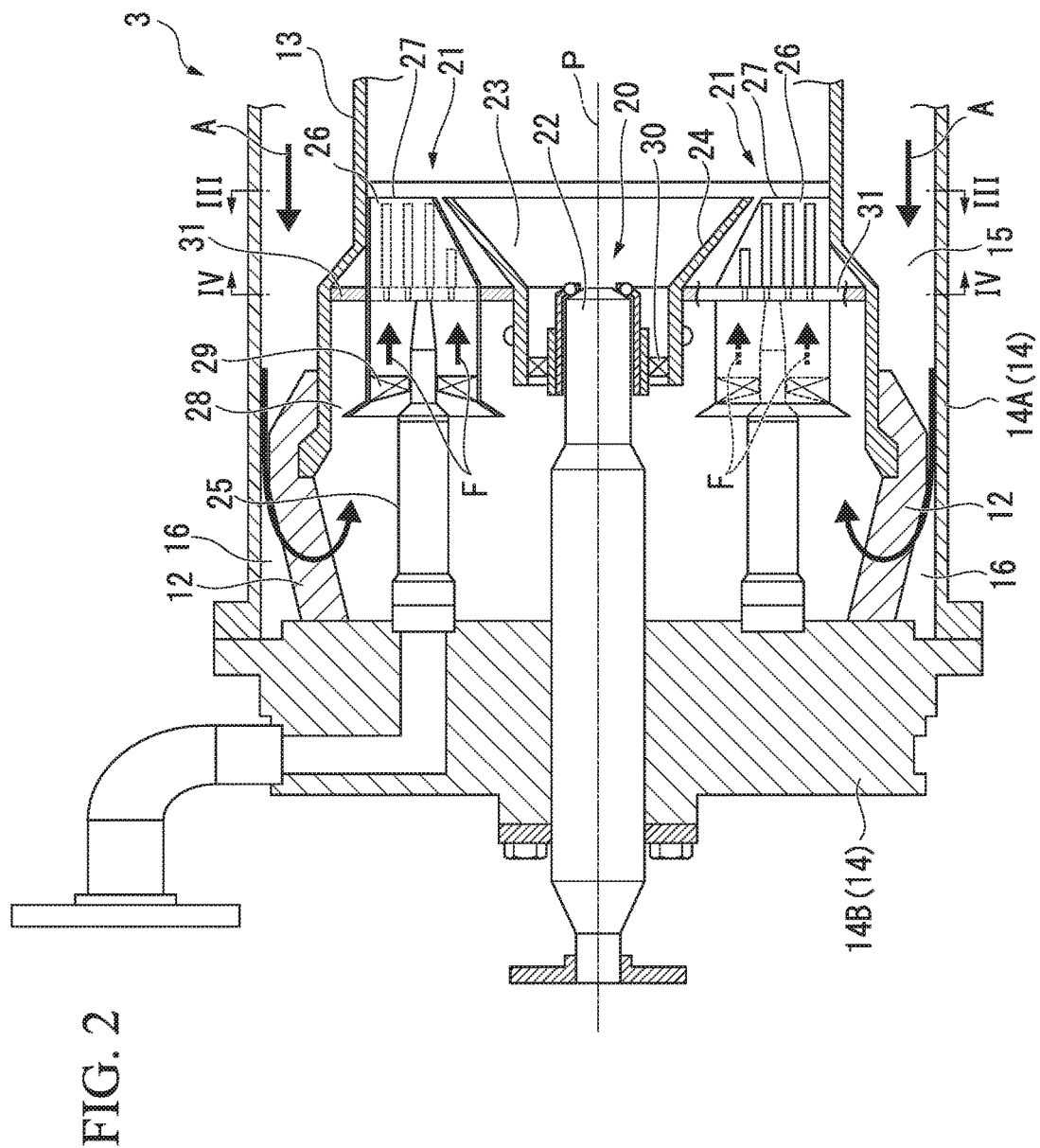
FIG. 2 is a cross-sectional schematic view of a combustor according to the first embodiment of the present invention when seen from a direction perpendicular to an axis thereof.

As shown in FIG. 2, the combustor 3 according to the embodiment includes a combustor basket 13 accommodated in the casing 9, and an outer shell 14 configured to cover an outer circumferential side of the combustor basket 13.

The combustor basket 13 is a hollow tubular member. A transition piece (not shown) is connected to a downstream side of the combustor basket 13. The transition piece is a member formed in a hollow tubular shape, like the combustor basket 13 and the outer shell 14. Flames formed by the combustor 3 are maintained in the transition piece.

Further, the outer shell 14 has an outer shell main body 14A having a tubular shape, and an outer shell base section 14B having a flange shape and configured to support an end portion of one side of the outer shell main body 14A. The combustor basket 13 is fixed to the outer shell base section 14B by a plurality of fixing members 12.

An air flow path 15 through which the compressed air A flows is formed between an inner circumferential surface of the outer shell 14 and an outer circumferential surface of the combustor basket 13. The compressed air A flowing through the air flow path 15 is supplied into the combustor basket 13 as the compressed air A is rotated in an inversion section 16 of a bottom portion of the outer shell 14. Further, the above-mentioned fixing members 12 are arranged in the circumferential direction of the combustor 3 at intervals. Accordingly, a gap is formed between adjacent fixing members 12. As a result, the compressed air A is introduced into the combustor basket 13 through the gap.

Further, the combustor 3 includes a second burner 20 and first burners 21 in the combustor basket 13. The second burner 20 is formed along an axis P of the combustor basket 13. Further, the second burner 20 is surrounded by the plurality of first burners, which will be described below, from the outside in the radial direction of the axis P. The second burner 20 ejects fuel supplied from the outside from a pilot nozzle 22. Flames are formed by igniting the fuel ejected from the pilot nozzle 22.

Further, a pilot cone 23 is installed at the second burner 20. The pilot cone 23 is a tubular member that surrounds an outer circumferential side of the pilot nozzle 22. In addition, the pilot cone 23 has a tapered cone section 24 having an inner diameter dimension gradually increased from the vicinity of the pilot nozzle 22 toward a downstream side. The tapered cone section 24 is provided to improve flame stabilization by restricting a diffusion range and a direction of the flames.

Further, the second burner 20 includes a pilot swirler 30 at an upstream side thereof. While not shown in detail, the pilot swirler 30 is an apparatus formed by arranging a plurality of swirl vanes at equal intervals in the circumferential direction of the axis P in the second burner 20. Each of the swirl vanes is disposed to form an angle with respect to the axis P from an upstream side toward a downstream side. Accordingly, the compressed air A passing through the pilot swirler 30 becomes a swirling flow by adding a swirling element such as a swirl vane.

Further, the plurality of first burners 21 are installed inside the combustor basket 13. In the embodiment, four first burners 21, 21, 21 and 21 are installed in the circumferential direction of the second burner 20. More specifically, the first burners 21 are disposed at the outer circumferential side of the second burner 20 at equal intervals in the circumferential direction. The first burners 21 extend along the axis P of the combustor basket 13 to be parallel to the above-mentioned second burner 20.

A main nozzle 25 is installed at tip portions of the first burners 21. The main nozzle 25 is formed in a conical shape having an appearance that is gradually reduced from the downstream side toward the upstream side, i.e., toward a tip side.

Further, extension pipes 26 are installed at outer circumferential sides of the first burners 21. The extension pipes 26 are members formed in a substantially tubular shape to surround the first burners 21 from the outer circumferential side. End portions of the extension pipes 26 connected to the first burners 21 are formed in circular shapes to correspond to cross-sectional shapes of the first burners 21.

Meanwhile, when seen from a direction intersecting the axis P, among wall surfaces of the extension pipe 26, a wall surface adjacent to the pilot cone 23 is formed to be inclined to be gradually separated from the axis P from the upstream side toward the downstream side.

Figure 3:
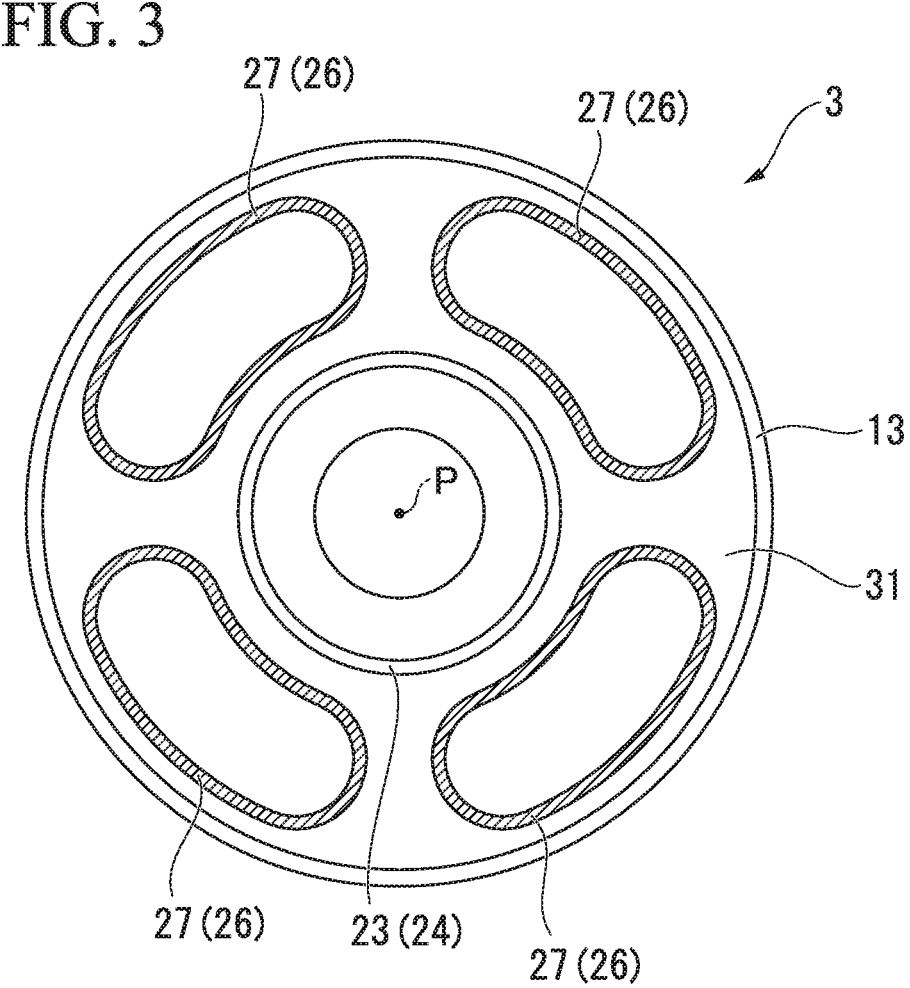
FIG. 3 is a cross-sectional view taken along line III-III of FIG. 2.

Further, as shown in FIG. 3, an opening section 27 at a downstream side of each of the extension pipes 26 has a substantially elliptical cross-sectional shape extending in the circumferential direction when seen from the axis P direction. Further, a portion of the ellipse that forms the cross section adjacent to the tapered cone section 24 of the pilot cone 23 is recessed along an arc that forms an outer edge of the tapered cone section 24. Meanwhile, the portion adjacent to the combustor basket 13 protrudes along an inner edge of the combustor basket 13 while being slightly curved. That is, a cross-sectional shape of the extension pipe 26 is formed to be gradually deformed from a circular shape to form an elliptical shape curved in one direction from the upstream side toward the downstream side.

A region inside the extension pipe 26 formed as described above is a main flow path 28 through which the compressed air A passes.

Returning to FIG. 2, like the second burner 20, each of the first burners 21 includes a main swirler 29 installed inside the extension pipe 26. The compressed air A passing through the main swirler 29 becomes a swirling flow by adding a swirling element such as a swirl vane.

Fuel is injected to the first burner 21 having the above-mentioned configuration from a fuel injection hole (not shown). For example, the fuel injection hole is formed in the main swirler 29.

The injected fuel is mixed with the compressed air A in the combustor basket 13 to generate a pre-mixed gas F. Due to the swirling flow generated by the main swirler 29, the pre-mixed gas F flows through the main flow path 28 toward the downstream side while swirling around the first burners 21.

Figure 4:
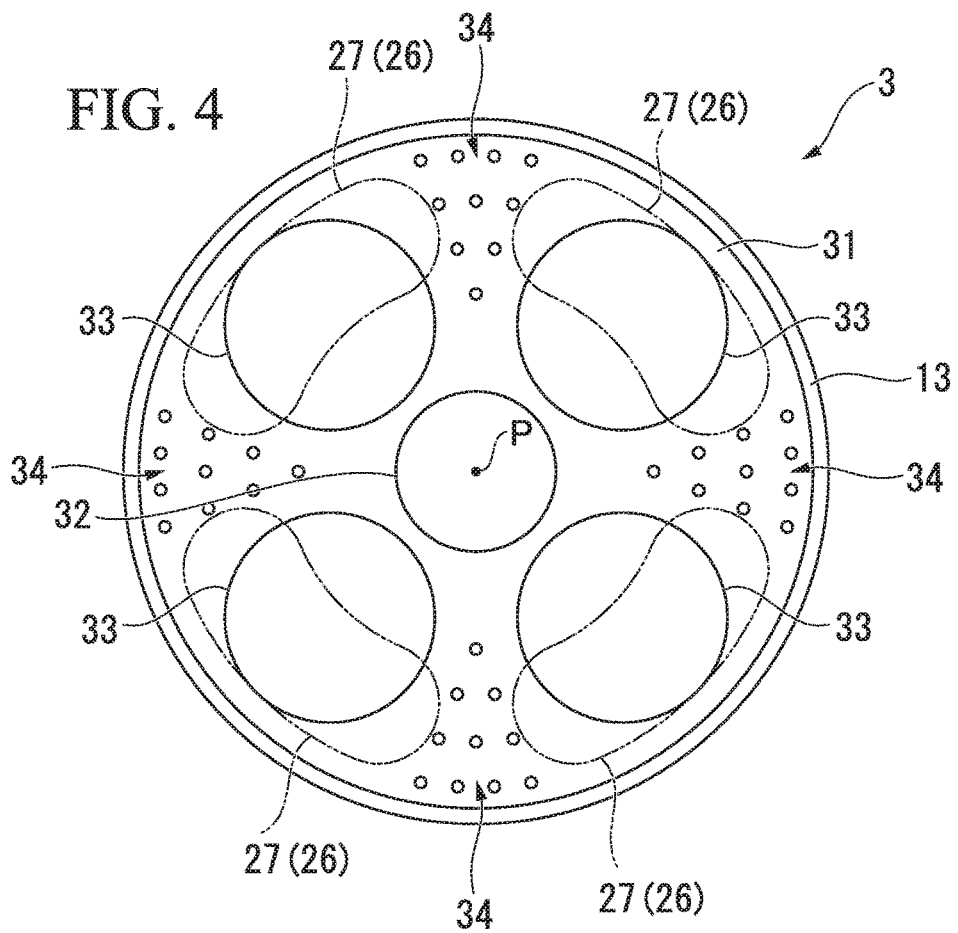
FIG. 4 is a cross-sectional view taken along line IV-IV of FIG. 2.
Figure 5:
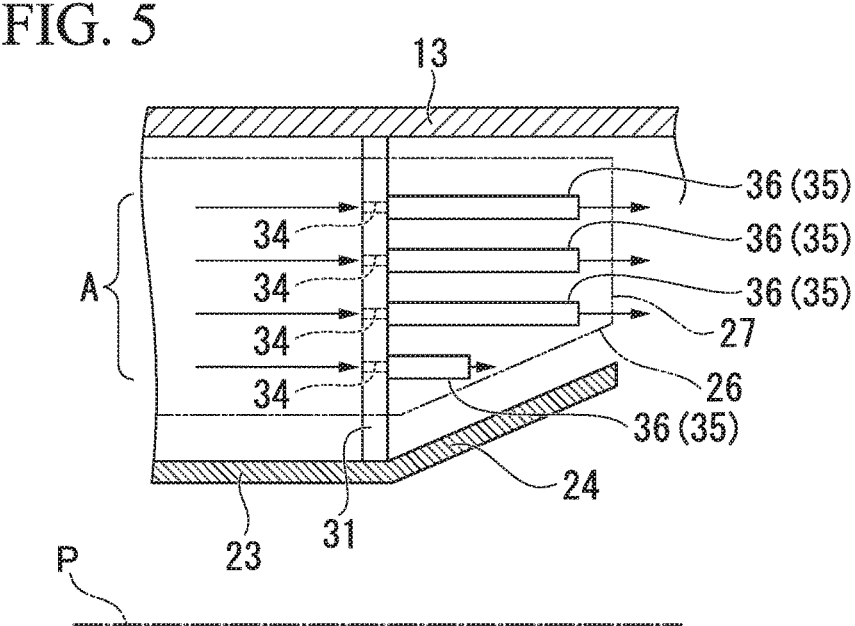
FIG. 5 is an enlarged view of a major part of the combustor according to the first embodiment of the present invention.

Further, the second burner 20 and the first burners 21 configured as described above are supported by a base plate 31 and fixed to the inside of the combustor basket 13. As shown in FIG. 4, the base plate 31 is a substantially circular plate-shaped member formed to correspond to a cross-sectional shape of the combustor basket 13. A second burner support opening 32 configured to support the second burner 20 and surround the second burner 20 from the outside in the circumferential direction is formed at a region including a center point of the base plate 31. The second burner support opening 32 has an opening diameter corresponding to an outer diameter dimension of the second burner 20.

A plurality of (four) first burner support openings 33, 33, 33 and 33 configured to support the plurality of (four) first burners 21, 21, 21 and 21 are formed outside in the circumferential direction of the second burner support opening 32 at equal intervals in the circumferential direction. Like the second burner support opening 32, the first burner support opening 33 supports the first burners 21 to surround the first burners 21 from the outside in the circumferential direction.

Further, a plurality of through-holes 34 through which the compressed air A (the base plate air A) passing through the main flow path 28 passes are formed in the base plate 31.

More specifically, the plurality of through-holes 34 are formed in the region between the first burner support openings 33 adjacent to each other. Each of the through-holes 34 has an opening diameter smaller than that of the first burner support opening 33 or the second burner support opening 32.

Accurate positions at which the through-holes 34 are formed on the base plate 31 or the number of the through-holes 34 are appropriately determined according to design. As an example, the through-holes 34 according to the embodiment are formed such that the number of through-holes 34 is gradually increased as they go away from a center (the axis P) of the base plate 31 to the outside in the radial direction. Specifically, one through-hole 34 is formed at a position closest to the center. Further, the number of through-holes 34 is increased one by one toward the outside in the radial direction. That is, two through-holes 34 are formed at positions of a second row counted from the center toward the radial direction. Three (n) through-holes 34 are formed at positions of a third (an $n^{th}$) row Base plate air extension sections 35 (base plate air guide sections) are formed at the plurality of through-holes 34 formed as described above to correspond to at least portions of the plurality of through-holes 34 (see FIG. 10). The base plate air extension sections 35 are formed to guide and eject the compressed air A (the base plate air A) ejected from the upstream side toward the downstream side of the base plate 31 through the through-holes 34 toward the downstream side farther than the base plate 31.

The base plate air extension section 35 according to the embodiment is formed by a plurality of pipe bodies 36 extending from a surface of a downstream side of the base plate 31 toward the downstream side along the axis P. Inner diameter dimensions of the pipe bodies 36 are set to be substantially equal to opening diameters of the through-holes 34. Further, the inside of the pipe body 36 is set to have an opening diameter that is constant from the upstream side to the downstream side.

In addition, the plurality of pipe bodies 36 extend to the vicinity of the opening section 27 of the extension pipe 26 from the base plate 31 toward the downstream side. More specifically, end portions of the downstream side of the pipe bodies 36 are disposed closer to the upstream side than the opening section 27 of the extension pipe 26.

Meanwhile, among the plurality of pipe bodies, the pipe body 36 installed closest to the axis P is set such that a dimension in the axis P direction is decreased in comparison with the other pipe bodies 36. Accordingly, interference with the tapered cone section 24 of the pilot cone 23 is avoided.

As the base plate air extension section 35 is installed in the combustor 3 configured as described above, the base plate air A ejected from the through-holes 34 can be guided toward the downstream side farther than the base plate 31. Accordingly, the probability of backfire by flames formed by the pre-mixed gas F ejected from the extension pipe 26 propagating backward toward the base plate 31 of the upstream side can be reduced.

Here, it is known that a region (a low speed region) where the flow velocity of the pre-mixed gas F is low is generated in the combustor 3 in which the base plate air extension section 35 is not formed. In such a low speed region, as the flames propagate backward, a phenomenon referred to as backfire (flashback) is likely to occur.

In particular, in the region formed between the plurality of extension pipes 26 adjacent to each other on the base plate 31, in addition to the fact that the base plate air only flows toward the downstream side, loss in flow velocity of the base plate air is increased as it goes toward the position away from the axis P of the combustor 3. Accordingly, the probability that the pre-mixed gas F is introduced from the inside of the extension pipe 26 toward the outside to flow backward in the direction of the base plate 31 is increased. That is, the probability of occurrence of backfire in the low speed region formed between the extension pipes 26 is increased.

However, as described above, as the base plate air extension section 35 (the pipe bodies 36) is installed in the combustor 3 according to the embodiment, high speed base plate air is supplied into the above-mentioned low speed region. Accordingly, the probability of the backward propagation of the flames can be reduced by increasing the flow velocity in the low speed region. That is, the probability of the backfire occurring in the combustor 3 can be reduced.

Further, according to the above-mentioned configuration, the pipe bodies 36 formed to correspond to the through-holes 34 are used as the base plate air extension section 35. Further, the pipe bodies 36 extend from the base plate 31 toward the downstream side. Accordingly, the base plate air A ejected from the through-holes 34 can be more reliably guided and ejected toward the downstream side of the base plate 31.

Variant of First Embodiment

Figure 6:
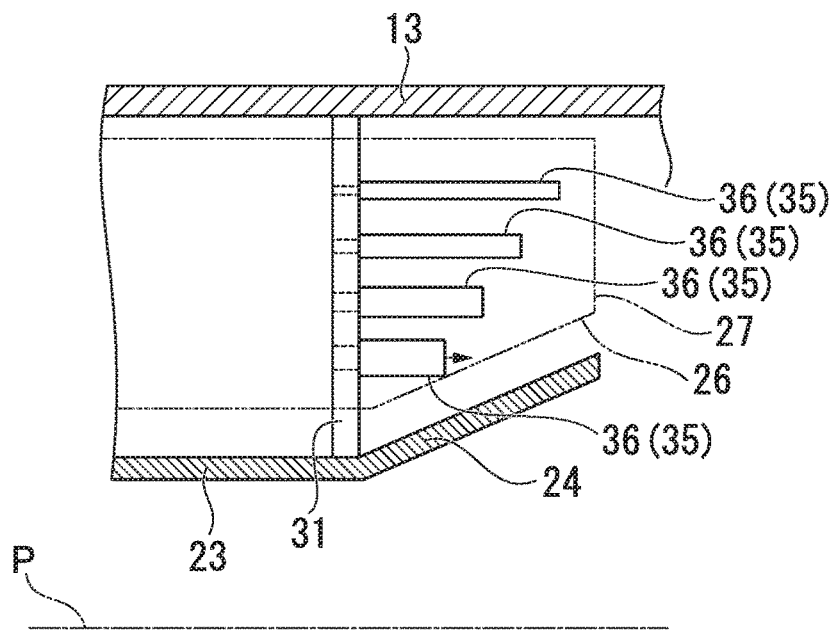
FIG. 6 is an enlarged view of a major part showing a variant of the combustor according to the first embodiment of the present invention.

Next, a variant of the base plate air extension section 35 according to the first embodiment of the present invention will be described with reference to FIG. 6. As shown in FIG. 6, an inner diameter of the base plate air extension section 35 according to the variant is set to be decreased at the pipe bodies 36 disposed at positions separated from the axis P. In addition, dimensions in the axis P direction of the pipe bodies 36 are set to be increased at the pipe bodies 36 disposed at positions separated from the axis P.

As described above, a decrease in flow velocity of the compressed air A (the base plate air A) in the vicinity of the combustor basket 13 is remarkably seen. Accordingly, the probability of backfire is increased in the vicinity of the combustor basket 13, i.e., at positions separated from the axis P. However, in the base plate air extension section 35 according to the variant, since the dimension in the axis P direction is set to be increased while the inner diameter is set to be decreased at the pipe bodies disposed at the positions separated from the axis P as described above, the flow velocity of the base plate air can be further increased. In addition, the position at which the base plate air is ejected from the base plate air extension section 35 can be set to a further downstream side. Accordingly, the probability of the backfire can be further reduced.

Second Embodiment

Figure 7:
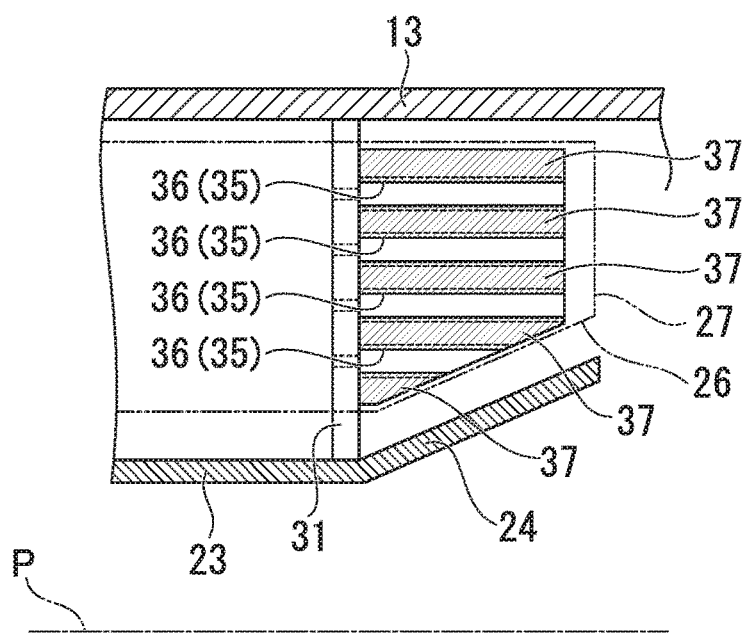
FIG. 7 is an enlarged view of a major part of a combustor according to a second embodiment of the present invention.
Figure 8:
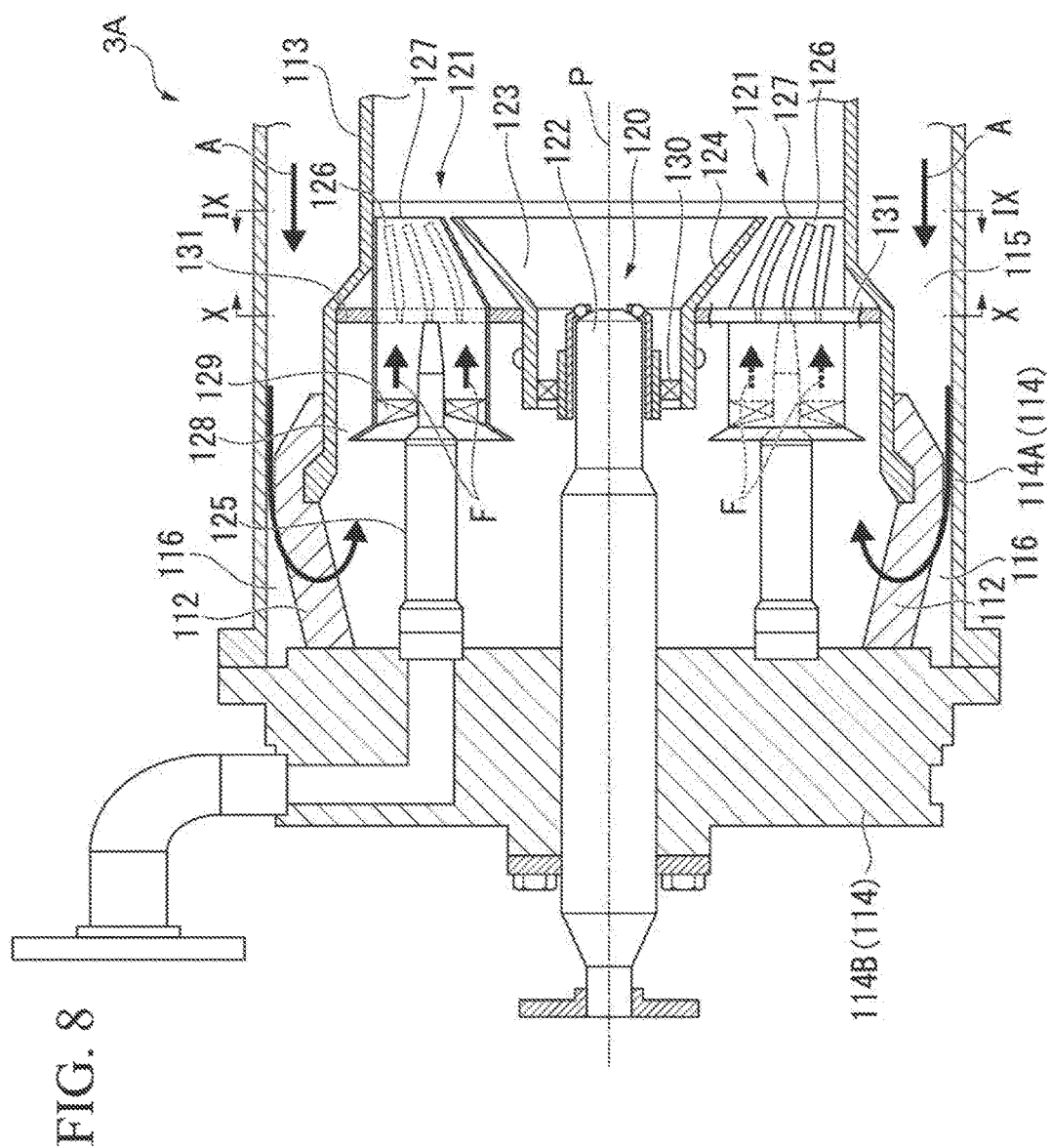
FIG. 8 is a cross-sectional schematic view of a combustor according to a third embodiment of the present invention when seen from a direction perpendicular to an axis thereof.
Figure 9:
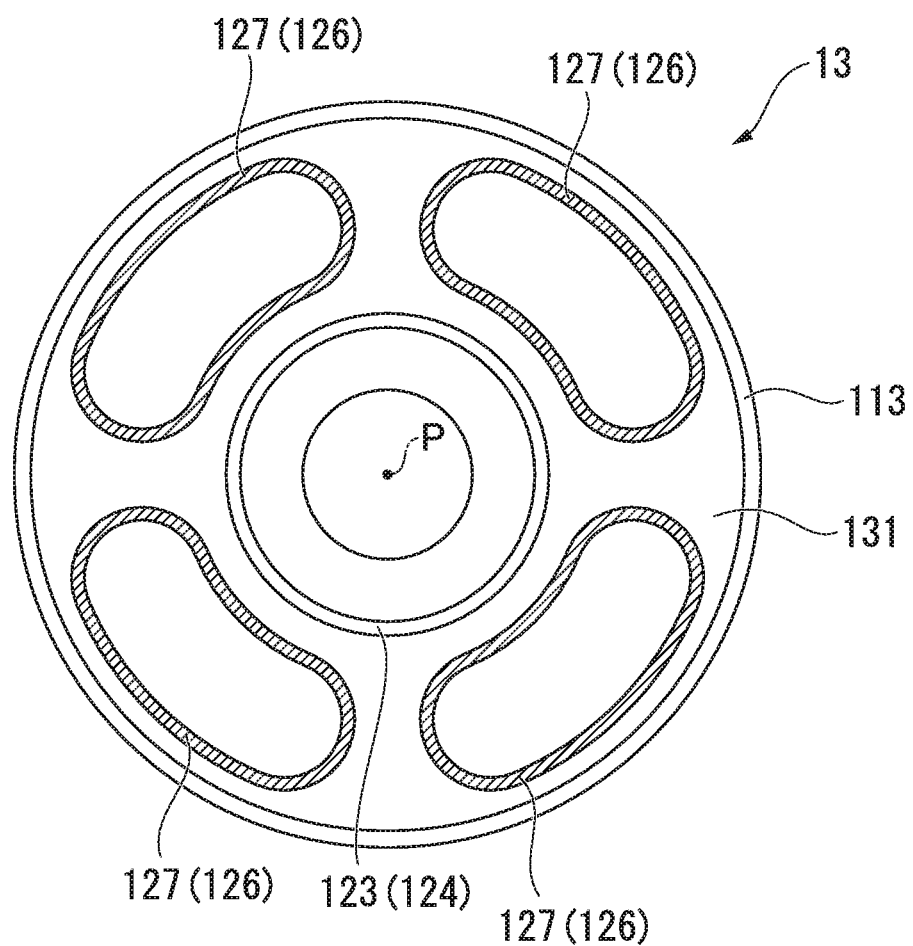
FIG. 9 is a cross-sectional view taken along line IX-IX of FIG. 8.

Next, a second embodiment of the present invention will be described with reference to FIG. 7. The combustor 3 according to the second embodiment is distinguished from the above-mentioned first embodiment in that the base plate air extension section 35 is configured as described below.

That is, the base plate air extension section 35 according to the embodiment includes a thick section 37 configured to fill a gap formed between the plurality of pipe bodies 36 formed from the base plate 31 toward the downstream side.

More specifically, the thick section 37 is a member integrally formed to extend from the surface of the downstream side of the base plate 31 to substantially the same extent as the dimension to reach a downstream side end portion of the pipe body 36. Accordingly, the appearance of the base plate air extension section 35 according to the embodiment has a thick plate shape in which a plurality of holes passing from one surface to the other surface are formed. In forming such a base plate air extension section 35, it is desirable to provide a large number of holes in a block-shaped metal material or the like, which is integrally formed.

According to the above-mentioned configuration, the gap formed between the plurality of pipe bodies 36 is filled with the thick section 37, which is solidly formed. Accordingly, the pre-mixed gas F does not flow backward toward the gap between the pipe bodies 36. Accordingly, the probability of backfire can be further reduced.

Hereinabove, while the embodiments of the present invention have been described in detail with reference to the accompanying drawings, specific configurations are not limited to the embodiments, and design changes and so on may be made without departing from the spirit of the present invention.

For example, in the embodiment, the through-holes 34 formed in the base plate 31 and the opening shapes of the pipe bodies 36 corresponding thereto have been described as a circular shape. However, the opening shapes of these members are not limited to the circular shape and, for example, may be appropriately varied to a polygonal shape, an elliptical shape, or the like, according to design.

Further, in the above-mentioned embodiment, the insides of the pipe bodies 36 have been described as having a constant opening diameter from the upstream side to the downstream side. However, the opening diameters of the pipe bodies 36 are not limited thereto and, for example, the opening diameters may be gradually increased or decreased from the upstream side toward the downstream side.

Third Embodiment

Next, a combustor 3A according to a third embodiment of the present invention will be described with reference to FIGS. 8 to 12.

Figure 10:
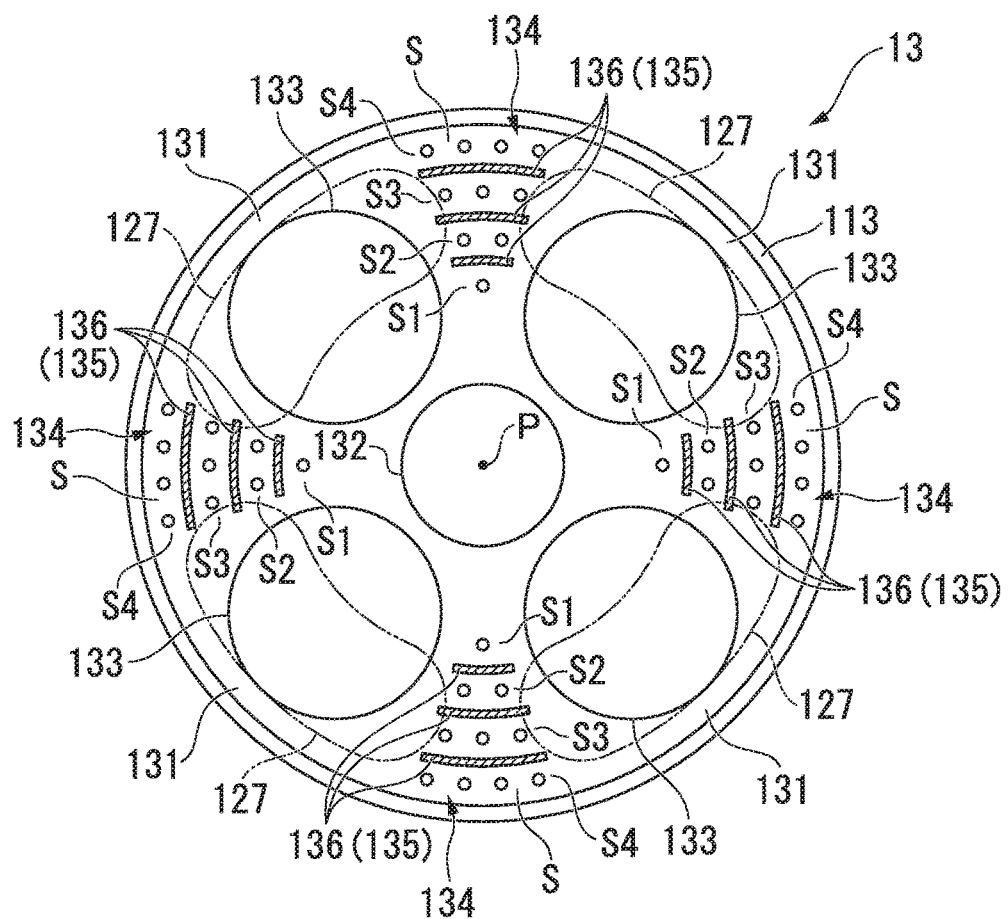
FIG. 10 is a cross-sectional view taken along line X-X of FIG. 8.

As shown in FIG. 10, a plurality of through-holes 134 through which compressed air A (base plate air A) passing through a main flow path 128 passes are formed in a base plate 131 of the embodiment. More specifically, the plurality of through-holes 134 are formed in a region S between adjacent first burner support openings 133. The region S is a substantially triangular region surrounded by an arc shape of a second burner support opening 132, arc shapes of the first burner support openings 133 and 133 adjacent to each other, and the arc shape that forms an outline of the base plate 131. The through-holes 134 have opening diameters smaller than that of the first burner support opening 133 or the second burner support opening 132.

The accurate positions at which the through-holes 134 are formed in the region S on the base plate 131 and the number of through-holes 134 are appropriately determined according to design. As an example, the through-holes 134 according to the embodiment are set such that the number of through-holes 134 is increased as they are separated from the center (the axis P) of the base plate 131 to the outside in the radial direction. Specifically, one through-hole 134 is formed at the position closest to the center in each of the regions S. Further, the number of through-holes 134 is increased one by one toward the outside in the radial direction. That is, two through-holes 134 are formed at positions of a second row counted from the center toward the radial direction. Three (n) through-holes 134 are formed at positions of a third (an $n^{th}$) row.

A plurality of partition plates 136 serving as a base plate air direction change section 135 (a base plate air guide section) are formed in the regions S on the base plate 131 configured as described above (see FIG. 10). The partition plates 136 divide the regions S on the base plate 131 into a plurality of partitions S1, S2, S3 and S4 arranged in the radial direction.

One to four through-holes 134 are disposed in the partitions S1 to S4, respectively. That is, one through-hole 134 is formed in the partition S1, and two through-holes 134 and 134 are formed in the partition S2. Similarly, three through-holes 134 are formed in the partition S3, and four through-holes 134 are formed in the partition S4. In other words, since four rows of through-holes are formed, three partition plates 136, 136 and 136 are formed in the regions between the rows of the through-holes 134.

Figure 11:
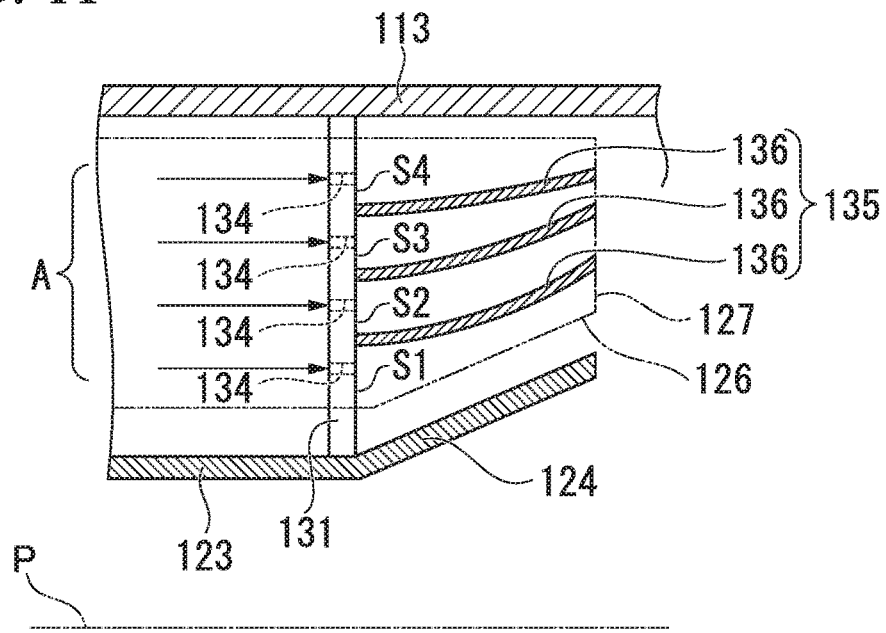
FIG. 11 is an enlarged view of a major part of the combustor according to the third embodiment of the present invention.

In addition, the plurality of (three) partition plates 136, 136 and 136 have arc shapes curved toward the outside in the radial direction when seen from the axis P direction, and all of the partition plates have arc shapes disposed coaxially with the axis P. Further, as shown in FIG. 11, when seen from the direction perpendicular to the axis P, the partition plate 136 is formed to be gradually curved from the upstream side toward the downstream side in the direction away from the axis P, i.e., toward the outside in the radial direction. In other words, the partition plates 136 are formed to be curved toward the axis P in the middle of the extension thereof. In addition, among the partition plates 136, a degree of curvature toward the outside in the radial direction is increased at the partition plates 136 disposed inside in the radial direction.

The plurality of partition plates 136 extend from the base plate 131 toward the downstream side to the vicinity of an opening section 127 of an extension pipe 126. More specifically, end portions of the downstream side of the partition plates 136 are disposed at a slightly upstream side of the opening section 127 of the extension pipe 126.

In the combustor 3A configured as described above, as the partition plates 136 serving as the base plate air direction change section 135 are formed at the downstream side of the base plate 131, at least some of the base plate air A ejected from the through-holes 134 can be changed in direction toward a desired region (for example, a low speed region) at the downstream side of the base plate 131. Accordingly, flow distribution of the base plate air A can be optimized. Accordingly, the probability of backfire of the flames formed by the pre-mixed gas F ejected from the extension pipe 126 due to a propagation of the flames toward the base plate 131 of the upstream side can be reduced.

Here, it is known that a region (a low speed region) in which the flow velocity of the pre-mixed gas F is low is generated in the combustor 13 in which the base plate air direction change section 135 is not formed. In such a low speed region, as the flame propagates toward the upstream side, a phenomenon referred to as backfire (flashback) is likely to occur.

In particular, in the region S formed between a plurality of extension pipes 126 adjacent to each other on the base plate 131, in addition to the fact that the base plate air A flows only toward the downstream side, a loss in flow velocity of the base plate air A is increased toward the position away from the axis P of the combustor 13. Accordingly, the probability that the pre-mixed gas F is turned from the inside toward the outside of the extension pipe 126 to propagate backward in the direction of the base plate 131 is increased. That is, the probability of occurrence of backfire in the low speed region formed between the extension pipes 126 is increased.

However, as the base plate air direction change section 135 (the partition plates 136) is formed in the combustor 13 according to the embodiment as described above, the probability of backfire can be reduced.

Further, in the above-mentioned configuration, the partition plates 136 formed to correspond to the through-holes 134 serving as the base plate air direction change section 135 are used. Further, the partition plates 136 extend from the base plate 131 toward the downstream side. Accordingly, the base plate air A ejected from the through-holes 134 can be reliably guided and ejected toward the downstream side of the base plate 131.

Variant of Third Embodiment

Figure 12:
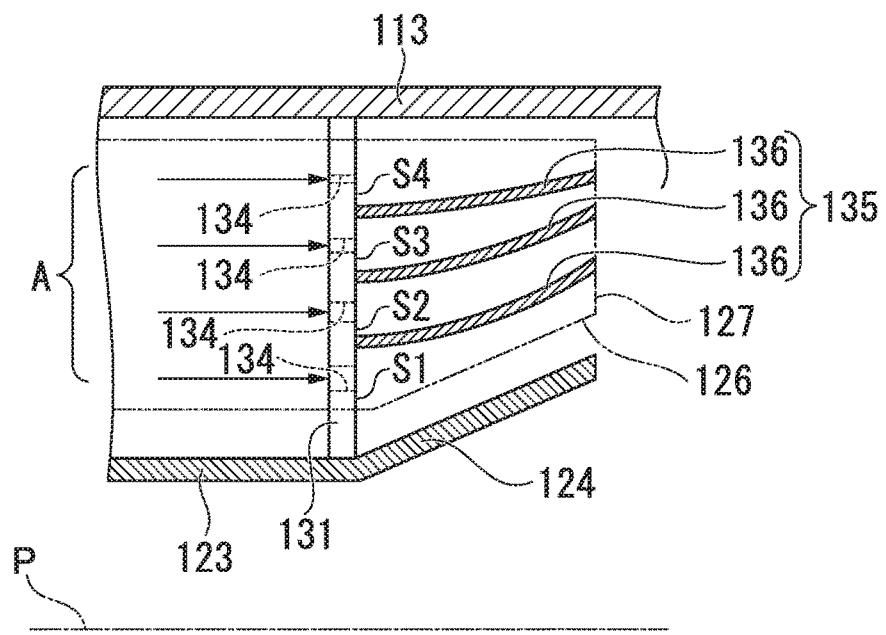
FIG. 12 is an enlarged view of a major part showing a variant of the combustor according to the third embodiment of the present invention.

Next, a variant of the above-mentioned embodiment will be described with reference to FIG. 12. As shown in FIG. 12, in the combustor 13 according to the variant, inner diameters of the through-holes 134 are set to be reduced as the through-holes 134 are disposed at positions separated from the axis P.

As described above, a decrease in flow velocity of the compressed air A (the base plate air A) in the vicinity of a combustor basket 113 is remarkably seen. Accordingly, the probability of backfire in the vicinity of the combustor basket 113, i.e., the positions separated from the axis P is increased. However, in the combustor 13 according to the variant, the inner diameters of the through-holes 134 are set to be decreased as the through-holes 134 are disposed at the positions separated from the axis P as described above. Accordingly, the base plate air A can be more rapidly ejected as the through-holes 134 are disposed at the positions separated from the axis P. Accordingly, the probability of backfire occurring due to a propagation of the flames of the pre-mixed gas F can be further reduced.

Further, in the above-mentioned embodiments and variants, the dimensions in the axis P direction of the partition plates 136 are substantially the same. However, the dimensions in the axis P direction of the partition plates 136 may be set to be increased as the partition plates 136 are disposed at the positions separated from the axis P. According to the above-mentioned configuration, the base plate air A can be further guided toward the downstream side as the partition plates 136 are separated from the axis P. Accordingly, the probability of backfire can be further reduced.

Hereinabove, while the third embodiment of the present invention has been described in detail with reference to the accompanying drawings, the specific configurations are not limited to the embodiment and design changes or the like may be made without departing from the spirit of the present invention.

For example, in the third embodiment, the opening shapes of the through-holes 134 formed in the base plate 131 have been described as the circular shapes. However, the opening shapes of these members are not limited to the circular shape and, for example, may be appropriately varied to a polygonal shape, an elliptical shape, or the like, according to design.

Further, in the above-mentioned third embodiment, thicknesses of the partition plates 136 (a dimension in the radial direction of the combustor 13) have been described as being constant from the upstream side to the downstream side. However, the thicknesses of the partition plates 136 are not limited thereto and, for example, the thicknesses may be gradually increased or decreased from the upstream side toward the downstream side.

In addition, in the above-mentioned third embodiment, the example in which the partition plate 136 disposed outside in the radial direction among the three partition plates 136 is largely curved toward the outside in the radial direction. In particular, the example in which all of the partition plates 136 are also curved toward the outside in the radial direction has been shown. However, the aspect of the partition plates 136 is not limited thereto and, for example, one partition plate 136 is not curved and may be formed to extend straight along the axis P.

Further, in the third embodiment, four first burners 121 installed in a circumferential direction of a second burner 120 have been described. However, the number of first burners 121 is not limited thereto and, for example, another number of first burners may be provided as long as the number is plural such as eight or the like.

INDUSTRIAL APPLICABILITY

According to the above-mentioned configuration, the probability of backfire in the combustor can be further reduced.

REFERENCE SIGNS LIST

1 . . . gas turbine 2 . . . compressor 3 . . . combustor 4 . . . turbine 5 . . . rotor 6 . . . stator 7 . . . rotary shaft 8 . . . annular turbine blade group 9 . . . casing 10 . . . annular turbine vane group 12 . . . fixing member 13 . . . combustor basket 14 . . . outer shell 15 . . . air flow path 16 . . . inversion section 20 . . . second burner 21 . . . first burner 22 . . . pilot nozzle 23 . . . pilot cone 24 . . . tapered cone section 25 . . . main nozzle 26 . . . extension pipe 27 . . . opening section 28 . . . main flow path 29 . . . main swirler 30 . . . pilot swirler 31 . . . base plate 32 . . . second burner support opening 33 . . . first burner support opening 34 . . . through-hole 35 . . . base plate air extension section 36 . . . pipe body 37 . . . thick section 135 . . . base plate air direction change section 136 . . . partition plate S . . . region S1 to S4 . . . partitions A . . . compressed air (base plate air) F . . . pre-mixed gas G . . . combustion gas O . . . axis P . . . axis

What is claimed is:
1. A combustor comprising:
a plurality of first burners extending along an axis and spaced apart from each other in a circumferential direction;
a base plate having support openings configured to respectively support the plurality of first burners and a plurality of through-holes configured to eject base plate air to flow from the through-holes toward a side downstream of the base plate;
a plurality of extension pipes supported by the base plate to correspond to the first burners and configured to guide a pre-mixed gas ejected from the first burners toward the side downstream of the base plate; and
a base plate aft extension section configured to change a direction of at least some of the base plate air ejected from the through-holes and to guide and further eject the base plate air ejected from the through-holes toward a further downstream side of the base plate,
wherein the plurality of through-holes are formed in a region between ones of the support openings adjacent to each other in the circumferential direction,
wherein the base plate air extension section is formed by a plurality of pipe bodies respectively installed to correspond to at least one of the plurality of through-holes,
wherein the plurality of pipe bodies are arranged in the region, and are extending from a surface of a downstream side of the base plate toward the side downstream of the base plate,
wherein the extension pipes extend toward the side downstream of the base plate, and
wherein the plurality of pipe bodies extend toward the side downstream of the base plate such that respective downstream end portions of the plurality of pipe bodies are disposed slightly upstream of an opening section of a downstream side of the extension pipes.

2. The combustor according to claim 1, wherein inner diameters of the plurality of pipe bodies are set to be decreased from an inner diameter of the pipe body disposed at a position closest to the axis as the pipe bodies are disposed at positions separated from the axis.

3. The combustor according to claim 1, wherein dimensions in an axial direction of the plurality of pipe bodies are set to be increased from a dimension in the axial direction of the pipe body disposed at a position closest to the axis as the pipe bodies are disposed at positions separated from the axis.

4. The combustor according to claim 1, further comprising thick sections configured to fill gaps between the plurality of pipe bodies.

5. A combustor comprising:
a plurality of first burners extending along an axis and spaced apart from each other in a circumferential direction;
a base plate having support openings configured to respectively support the plurality of first burners and a plurality of through-holes configured to eject base plate air to flow from the through-holes toward a side downstream of the base plate;
a plurality of extension pipes supported by the base plate to correspond to the first burners and configured to guide a pre-mixed gas ejected from the first burners toward the side downstream of the base plate; and
a base plate air direction change section configured to change a direction of at least some of the base plate air ejected from the through-holes and direct the base plate air ejected from the through-holes toward a further downstream side of the base plate,
wherein the plurality of through-holes are formed in a region between ones of the support openings adjacent to each other in the circumferential direction,
wherein the base plate air direction change section is formed by a plurality of partition plates,
wherein the plurality of partition plates are arranged in the region, and are extending from a surface of a downstream side of the base plate toward the side downstream of the base plate, and
wherein the partition plates form a plurality of partitions including the through-holes by dividing the region in a radial direction of the combustor, a number of the through-holes is increased from a number of the through-holes formed in the partition disposed at a position closest to the axis as the partitions are disposed at positions separated from the axis,
wherein the extension pipes extend toward the side downstream of the base plate, and
wherein the partition plates extend toward the side downstream of the base plate such that respective end portions of the partition plates are disposed slightly upstream of an opening section of a downstream side of the extension pipes.

6. The combustor according to claim 5, wherein the plurality of the partition plates are formed to be gradually curved from the base plate toward the side downstream of the base plate in a direction away from the axis.

7. The combustor according to claim 5, wherein opening diameters of the through-holes are decreased from an opening diameter of the through-hole disposed at a position closest to the axis as the partitions are disposed at positions separated from the axis.

8. The combustor according to claim 1, further comprising a second burner disposed along the axis to be surrounded by the plurality of first burners from an outside in a radial direction of the axis.

9. A gas turbine comprising:
the combustor according to claim 1;
a compressor configured to supply compressed air into the combustor; and
a turbine configured to receive a combustion gas generated by combusting the pre-mixed gas in the combustor.

* * * * *